(12) United States Patent
Baer et al.

(10) Patent No.: US 10,951,618 B2
(45) Date of Patent: *Mar. 16, 2021

(54) REFRESH TOKEN FOR CREDENTIAL RENEWAL

(71) Applicant: Amazon Technologies, Inc., Reno, NV (US)

(72) Inventors: Graeme David Baer, Bellevue, WA (US); Dmitry Frenkel, Bothell, WA (US); Marc R. Barbour, Woodinville, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,985

(22) Filed: Dec. 5, 2019

(65) Prior Publication Data
US 2020/0153831 A1 May 14, 2020

Related U.S. Application Data

(63) Continuation of application No. 14/972,676, filed on Dec. 17, 2015, now Pat. No. 10,567,381.

(51) Int. Cl.
*H04L 29/06* (2006.01)
(52) U.S. Cl.
CPC .................................. *H04L 63/10* (2013.01)
(58) Field of Classification Search
USPC .......................................................... 726/7
See application file for complete search history.

(56) References Cited

U.S. PATENT DOCUMENTS 6,769,068 B1    7/2004  Brozowski
7,269,260 B2 *  9/2007  Adachi ................... H04L 63/04
                                                            380/270

(Continued)

FOREIGN PATENT DOCUMENTS

WO    WO 2015093887      6/2015

OTHER PUBLICATIONS

Freudenthal et al., "VPAF: a Flexible Framework for Establishing and Monitoring Prolonged Authorization Relationships", Digital Object Identifier: 10.4108I/CST.COLLABORATECOM2009.8366 (Year: 2009).*

(Continued)

*Primary Examiner* — Khalil Naghdali
(74) *Attorney, Agent, or Firm* — Hogan Lovells US LLP

(57) ABSTRACT

Security credentials issued by an entity, such as an identity broker, can have a limited lifetime. Access to resources or content under those credentials then can only be obtained for a limited period of time, limiting the ability of an unauthorized entity obtaining the credentials to utilize those credentials for access. Along with the credentials, a refresh token can be issued to a requesting client that can enable the limited lifetime of the credentials to be renewed up to a maximum lifetime of the credentials and/or the token. A service providing access can determine that the client has a valid copy of the refresh token when the credentials are about to expire, and if so can cause the lifetime of the credentials to be extended another credential lifetime. This renewal can be done transparent to a user and without again contacting the identity broker.

20 Claims, 6 Drawing Sheets

(56) References Cited

U.S. PATENT DOCUMENTS

| | | |
|---|---|---|
| 9,531,697 B2 | 12/2016 | Sondhi |
| 9,692,748 B2 | 6/2017 | Maheshwari |
| 9,990,786 B1 | 6/2018 | Ziraknejad |
| 2003/0149880 A1 | 8/2003 | Shamsaasef |
| 2005/0081055 A1 | 4/2005 | Patrick |
| 2010/0096452 A1 | 4/2010 | Habraken |
| 2010/0146500 A1 | 6/2010 | Joubert |
| 2012/0036271 A1* | 2/2012 | Patil .................. H04L 63/0272 709/227 |
| 2012/0159140 A1 | 6/2012 | Chang |
| 2012/0265880 A1 | 10/2012 | Warwick |
| 2013/0252583 A1 | 9/2013 | Brown |
| 2014/0020070 A1 | 1/2014 | Angal |
| 2014/0223516 A1 | 8/2014 | Vongsouvanh |
| 2014/0230020 A1 | 8/2014 | Mogaki |
| 2014/0282881 A1 | 9/2014 | Li |
| 2014/0373099 A1 | 12/2014 | Durbha |
| 2015/0089569 A1 | 3/2015 | Sondhi |
| 2015/0089623 A1 | 3/2015 | Sondhi |
| 2015/0135275 A1 | 5/2015 | Matsugashita |
| 2015/0150110 A1 | 5/2015 | Canning |
| 2015/0172271 A1 | 6/2015 | Barrows |
| 2015/0281199 A1 | 10/2015 | Sharma |
| 2015/0281213 A1 | 10/2015 | Sharma |
| 2015/0326539 A1 | 11/2015 | Sharma |
| 2015/0341334 A1 | 11/2015 | Bhimanaik |
| 2016/0014157 A1 | 1/2016 | Gomez |
| 2016/0028737 A1 | 1/2016 | Srinivasan |
| 2016/0072822 A1 | 3/2016 | Takayasu |
| 2016/0080383 A1 | 3/2016 | Hockings |
| 2016/0087956 A1 | 3/2016 | Maheshwari |
| 2016/0094530 A1 | 3/2016 | Mihaylov |
| 2016/0099924 A1 | 4/2016 | Mehta |
| 2016/0119291 A1 | 4/2016 | Zollinger |
| 2016/0127339 A1 | 5/2016 | Childs |
| 2016/0134616 A1 | 5/2016 | Koushik |
| 2016/0277413 A1 | 9/2016 | Ajitomi |
| 2016/0337354 A1 | 11/2016 | Smadja |
| 2016/0359861 A1 | 12/2016 | Manov |
| 2017/0006471 A1 | 1/2017 | Kim |
| 2017/0026376 A1 | 1/2017 | Matsugashita |
| 2017/0048233 A1 | 2/2017 | Khylkouskaya |
| 2017/0099146 A1 | 4/2017 | Sharma |
| 2017/0127276 A1 | 5/2017 | Koo |
| 2017/0142108 A1 | 5/2017 | Zhang |

OTHER PUBLICATIONS

Non-Final Rejection issued in U.S. Appl. No. 14/972,676 dated Aug. 17, 2017.

Non-Final Rejection issued in U.S. Appl. No. 14/972,676 dated Jun. 1, 2018.

Final Rejection issued in U.S. Appl. No. 14/972,676 dated Jan. 25, 2019.

Notice of Allowance and Fees Due issued in U.S. Appl. No. 14/972,676 dated Oct. 9, 2019.

* cited by examiner

REFRESH TOKEN FOR CREDENTIAL RENEWAL

CROSS-REFERENCE TO RELATED APPLICATIONS

This is a continuation application of U.S. patent application Ser. No. 14/972,676, filed on Dec. 17, 2015, entitled "REFRESH TOKEN FOR CREDENTIAL RENEWAL," which is hereby incorporated herein by reference in its entirety.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. These credentials can potentially be obtained by unintended third parties, who can gain unauthorized access to the resource environment, as well as the data and content stored therein. In order to minimize this potential problem, credentials can be given a limited lifetime such that any third party obtaining the credentials will only be able to use those credentials for their remaining lifetime. There is a tension in such an approach, however, as it is desirable to make the lifetime as short as possible to minimize the amount of time an unauthorized party obtaining the credentials can use them, but frequently having to obtain new credentials can be undesirable to a user, particularly when used for long tasks that may be difficult to complete if the credentials expire during the task.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of security credentials in an electronic environment. In particular, various approaches provide for the use of a refresh token with limited lifetime credentials, which can enable the lifetime of those credentials to be extended without having new or updated credentials issued by an identity broker or other such entity. A client device can submit a request for temporary security credentials to be used to obtain access to resources or content in a resource provider, service provider, or other multi-tenant environment. The credentials can be used to initiate and maintain sessions, and in some cases can enable resources of the environment to assume one or more roles associated with the credentials that enable performing tasks authorized for that role. The client device can store the refresh token, such that when the lifetime of the associated credentials is about to expire, the client device can provide proof of possession of a valid refresh token for the credentials whereby the lifetime of the credentials can be extended or renewed. The credential lifetime can be renewed one lifetime at a time, up to a maximum lifetime of the credentials and/or the refresh token. If the credentials are invalidated, the refresh token will also be invalidated and any credentials held by the environment will be unable to be renewed after the expiration of the current lifetime. The renewal can be performed transparent from the user and without again contacting the entity that initially issued the credentials.

Various other such functions can be used as well within the scope of the various embodiments as would be apparent to one of ordinary skill in the art in light of the teachings and suggestions contained herein.

Figure 1:
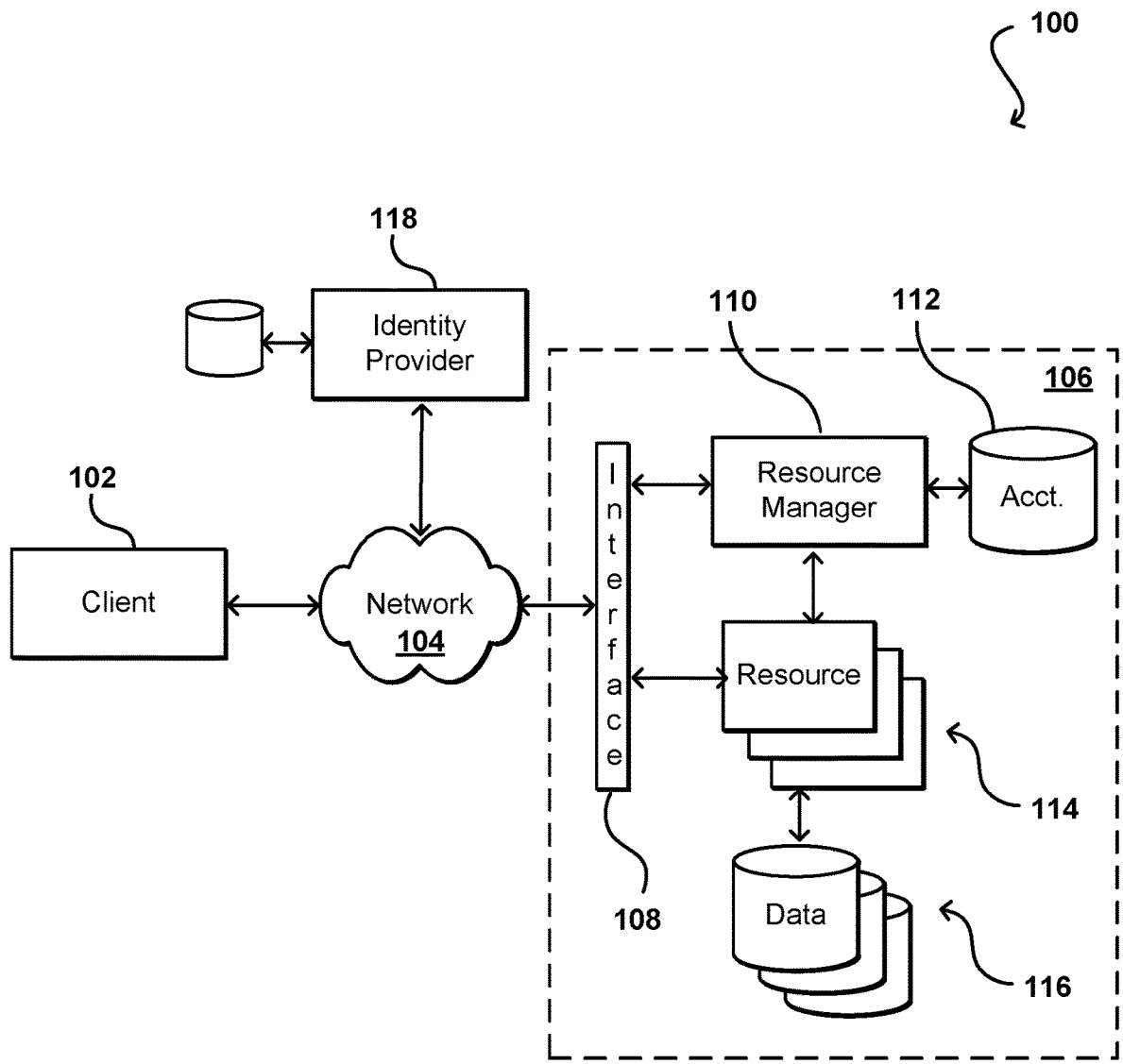
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, credentials provided by, or on behalf of, a user or client device can demonstrate that the source of a request for access has been authenticated, and can be used to verify that the source of the request is authorized to obtain, directly or indirectly, that access. This can include, for example, a resource or component in the resource provider environment 106 assuming a role of the user, or customer of the resource provider environment, in order to act on behalf of the user. This has the advantage to the user that a client or other component for the user can obtain access to the resources to obtain a series of tasks, without having to provide the credentials, or obtain new credentials, for every task. A potential downside, however, is that an unauthorized third party gaining access to, or a copy of, the credentials can also use them to assume the role of the user, and thus obtain similar access to the resources of the resource provider environment. It thus can be desirable in at least some situations to minimize the lifetime of these credentials in order to minimize the amount of "damage" that an unintended third party receiving the credentials can do under the assumed role or obtained access. The need to frequently obtain new credentials, however, undoes much of the benefit of the credentials having specified lifetimes in the first place, as the user would again have to frequently obtain new credentials, etc.

Accordingly, approaches in accordance with various embodiments can take advantage of a refresh token, or other such element, to enable the lifetime of a credential to be extended without additional work on behalf of a user or having to go back to the identity provider or other entity who issued the credentials. A refresh token in some embodiments can be requested during the original session creation or credential issuance call, where the user would otherwise obtain the credentials themselves. As part of the call, or a separate call, the requesting device can indicate a maximum validity period of the refresh token, subject to any maximum validity limitations, and in some cases can also specify the lifetime, and maximum lifetime, of the associated credential. For example, a credential may be configured to be valid for up to an hour. If the refresh token is valid for up to a day, then at the end of each hour during the day the credential can potentially have its lifetime extended by another lifetime, or another hour. As long as a client device making the request (s) has a valid copy of the refresh token, and as long as the state of the refresh token would still satisfy the current conditions under which the credentials would otherwise obtain access to the resource (i.e., the credentials have not been revoked), the credentials can be renewed and the effective lifetime of the credentials then extended up to a day, unless the credentials have a maximum lifetime otherwise specified, at which point the credential lifetime can be renewed only up to the maximum lifetime of the credential. If new credentials are issued such that the old credentials should no longer be valid, a new refresh token can be issued for the new credentials or the old refresh token can be otherwise invalidated. An entity obtaining a copy of the old credentials then will not be able to utilize the old credentials after the current lifetime expires.

Figure 2A:
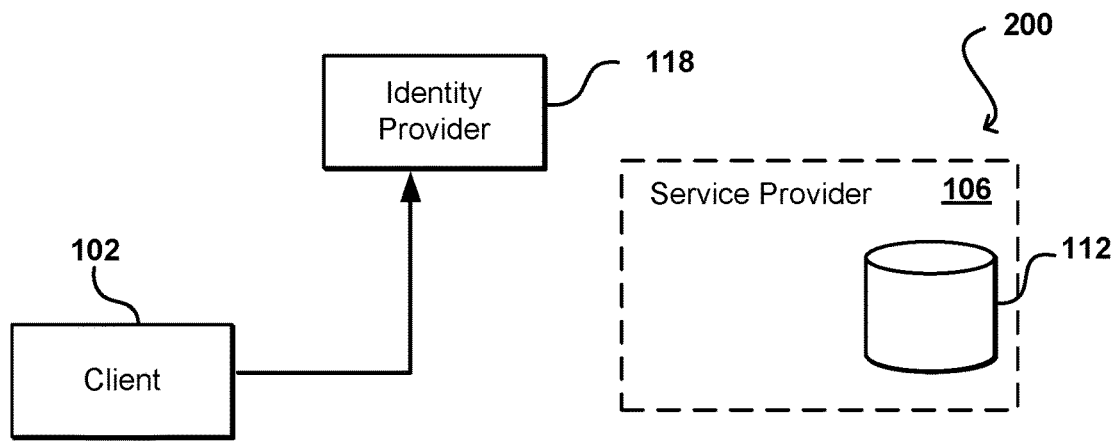
FIGS. 2A, 2B, and 2C illustrate an example approach wherein a refresh token can be utilized to extend the lifetime of a credential without having to contact the entity that issued the credential that can be utilized in accordance with various embodiments.
Figure 2B:
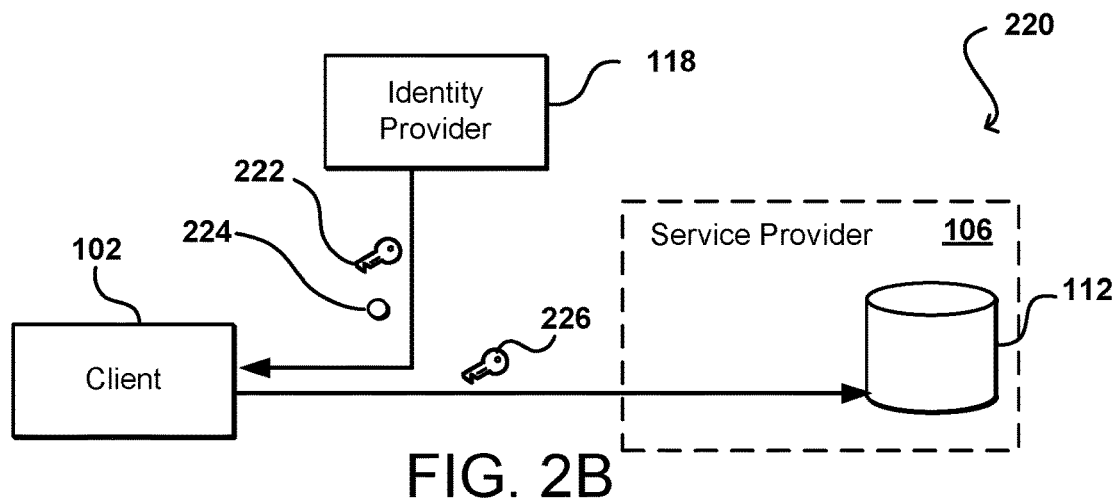
Figure 2C:
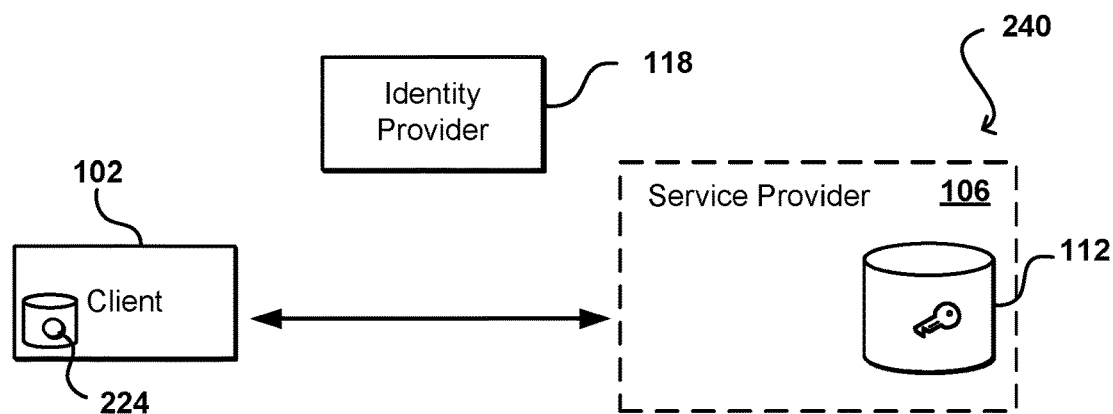

As an example, FIGS. 2A through 2C illustrate an example request flow that can be used to provide and refresh credentials that can be used in accordance with various embodiments. In the example situation 200 of FIG. 2A, a client device 102 associated with a customer of a service provider environment 106 can submit a request to an identity provider 118, or other such entity or service, to obtain one or more credentials that can be used to obtain access to resources, content, or functionality from the service provider environment 106. It should be noted that reference numbers can be carried over between figures for similar elements for simplicity of explanation, but such usage should not be interpreted as a limitation on the scope of the various embodiments unless otherwise specifically stated. In one embodiment, the client 102 can make a request, such as an application programming interface (API) call to the identity provider 118. In some embodiments, such as where the identity provider is an entity such as a corporation that has access rights in the service provider environment 106, the call can be a call to create a session or assume a role, whereby the client could be issued credentials that enable the client to request access associated with that particular role. In other embodiments, the client might first submit such a call to the service provider environment 106, which would then request credentials such that the client would separately contact the identity provider for the credentials. Various other approaches can be used as well within the scope of the various embodiments. As part of the request for credentials, the client can indicate whether a refresh token should be issued along with the credentials. If a refresh token is to be issued the client 102 can also send information about the maximum validity period for the refresh token, along with any policies, rules, or other information to be used in obtaining the credentials, generating the refresh token, or renewing the credentials, among other such options.

As illustrated in the example situation 220 of FIG. 2B, the identity provider 118 can perform any authentication, validation, authorization, or other such processes that would otherwise be used to determine to generate one or more credentials on behalf of the user. The identity provider can then provide the credentials 222 to the client device 102, whereby the client device 102 can provide the credentials 226 to the service provider environment 106, as appropriate. In some embodiments the identity provider might provide the credentials directly to the service provider in response to an authorized request. Upon receiving the credentials, the service provider environment 106 can store the credentials 226 in an appropriate place, such as a credential cache or repository 112, and can use those credentials to enable requests from the client device 102, or another device associated with the customer who can be authenticated on that device for use of those credentials, to have access or functionality obtained that are authorized under the credentials. Further, the refresh token 224 in this example can be provided to the client device 102 making the call, or another specified receiver, such that only the client device or another associated device having access to the token can cause the credentials 226 to be renewed. As mentioned, the renewal can occur as long as the refresh token is valid and the token and the token and credentials have not yet met or exceeded their maximum lifetime.

As illustrated in the example situation 240 of FIG. 2C, the client can store a copy of the refresh token 224 as long as that token remains valid. It can determined, by a credential manager of the service provider environment 106, the client 102, or another such system or service, that the credential 226 is nearing the end of its current lifetime. Accordingly, the client can invoke, or be prompted to invoke, a refresh session API or make another such call, which can trigger a re-evaluation of the authorization process for the original session, or a similar process on the current session, etc. In some embodiments the credential manager or another such component can trigger the re-evaluation. The re-evaluation process can include, for example, verifying that an access key identifier that was used to create the original session is still valid and associated with a user with the appropriate permission(s). For a security assertion markup language (SAML)-based implementation, this can involve making sure that a certificate that was used to sign the original assertion is still included in the SAML metadata. Various other such approaches can be used as well within the scope of the various embodiments. In some embodiments the re-evaluation can include determining whether any configuration change has occurred that is an "extraordinary" change, or outside a set of specified, permissible, or expected changes. For example, a normal key rotation might be a permissible or "normal" change that should not prevent a previously issued credential from being renewed, absent other changes. A revocation of a credential, however, can be considered an extraordinary event that should prevent the credentials from being renewed even if the refresh token is otherwise valid. In one embodiment the client can send a request that is signed with the session key that includes the refresh token, or at least proof of possession of the refresh token. Thus, if it can be verified that the client device making the request has a valid copy of the refresh token, and the conditions are still met such that the credentials would have been initially provided and/or usable to obtain access, the lifetime of the credentials can be renewed without contacting the original identity provider who issued the credentials. Further, an application such as a console or browser application on the client can be configured to utilize the refresh token automatically during a session such that the user does not need to perform any tasks or even be aware that a refresh is occurring.

In one example, when a session is determined to be about to expire in the service provider environment, a sign-in process can be loaded that does not present a session expired page but instead attempts to detect the availability of a refresh token on the client device. The process could then obtain an updated sign-in session, derive a new client- or console-specific session, and redirect back to the console or browser. At this point, the console can update corresponding cookies, metadata, or other such information. In a Web-based implementation, a refresh token can be stored as, or in, a cookie stored on the client device, among other such options. As mentioned, the refresh token can include any appropriate information, such as may include the information used to obtain the original set of security credentials. This can include, for example, user information such as username or customer identifier, account information, relevant policy information, and the like.

Figure 3:
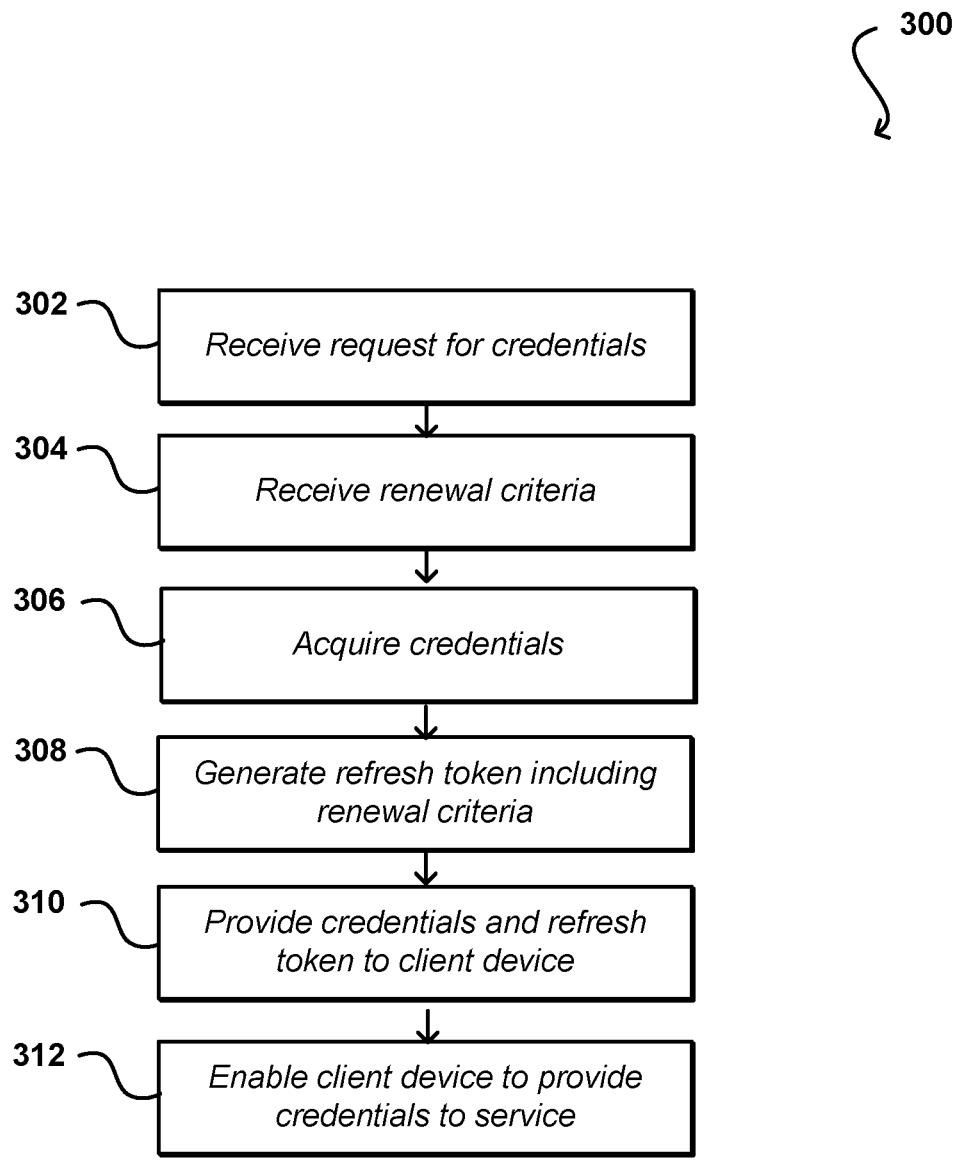
FIG. 3 illustrates an example process for issuing a refresh token with credentials that can be utilized in accordance with various embodiments.

FIG. 3 illustrates an example process 300 for issuing a refresh token with credentials that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, an entity, such as an identity provider, SAML broker, or certificate authority, can receive 302 a request for credentials. The request can include any appropriate information used to obtain security credentials, for example, as may include a username, user identifier, password, user credential, account information, applicable policies for the credentials, and the like. As part of the request, or as a separate request, one or more renewal criteria can be received 304, as may include information about whether to issue a refresh token and, if so, the maximum lifetime of that refresh token. Using at least the provided information, a decision can be made (using any appropriate process known or used for such purposes or described herein) to acquire 306 (i.e., generate or receive) and issue the credentials. As discussed, these can include access keys, certificates, or other such credentials. If so requested, the entity can also generate 308 a refresh token including or specifying at least one refresh criterion, such as a maximum lifetime or refresh policy. The refresh token in some embodiments can also include at least some of the information that was used to generate the credentials. The credentials and refresh token can then be provided 310 to the requesting client or other associated device. The client can then provide the credentials to a system or service requiring the credentials for access determinations. Further, the client can then be enabled 312 to provide at least proof of possession of the refresh token in order to renew the lifetime of the associated credentials.

Figure 4:
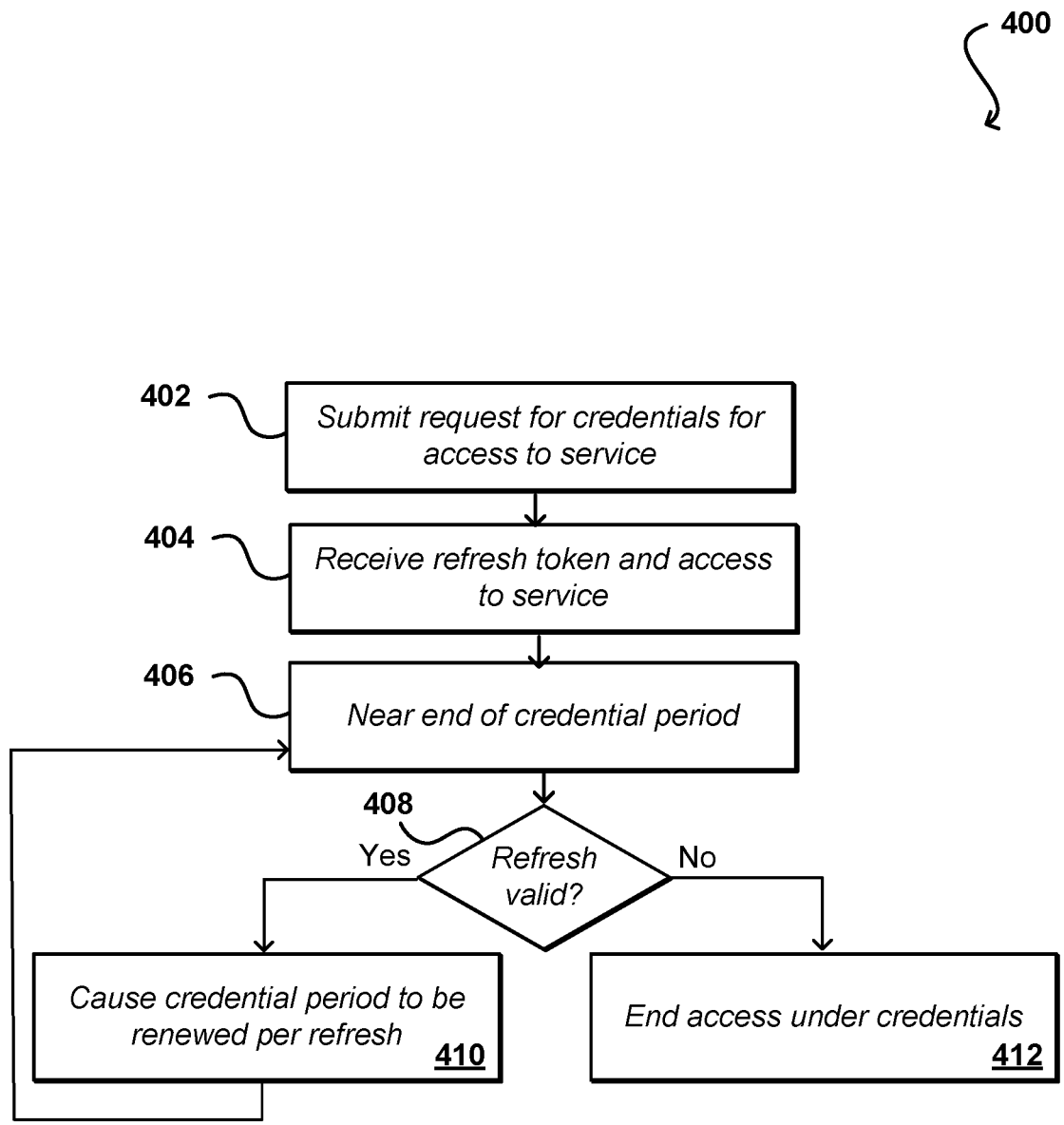
FIG. 4 illustrates an example process for obtaining and using a refresh token for resource access that can be utilized in accordance with various embodiments.

FIG. 4 illustrates an example process 400 whereby a client device can request and utilize a refresh token with credentials in accordance with various embodiments. In this example, the client device can submit 402 a request for credentials useful in obtaining access to resources or functionality from a service provider or other such resource or multi-tenant environment. As mentioned, the client device can provide any appropriate information needed to obtain the credentials, as well as any information about whether to generate a refresh token and, if so, the maximum lifetime for the token. The client can receive 404 the refresh token for local storage, and in at least some embodiments can receive the associated credentials as well. The credentials can also be provided to the service provider, whether by the client device or the entity issuing the credentials, among other such options. If it is determined, by the client or the service provider, that the lifetime of the credentials is nearing the end 406 of the current lifetime or period, a determination can be made 408 as to whether the refresh token is still valid for those credentials, and if so whether the refresh token has met its maximum lifetime. In some embodiments this determination is made on the client in response to a request from the service provider environment or in response to a monitoring application executing on the client device. If the refresh token is still valid, the client device can cause 410 the credential period or lifetime to be renewed, such as by providing proof of possession of a valid token, or a copy of the token signed under the session key, to the service provider. If the refresh token is no longer valid, such as where it has reached or exceeded its maximum lifetime or has otherwise been invalidated, the device can cause the access under the credentials to be ended 412. This can be in response to, for example, the client device indicating to the service provider that the client does not store a valid copy of a refresh token for the corresponding credentials, among other such options.

Figure 5:
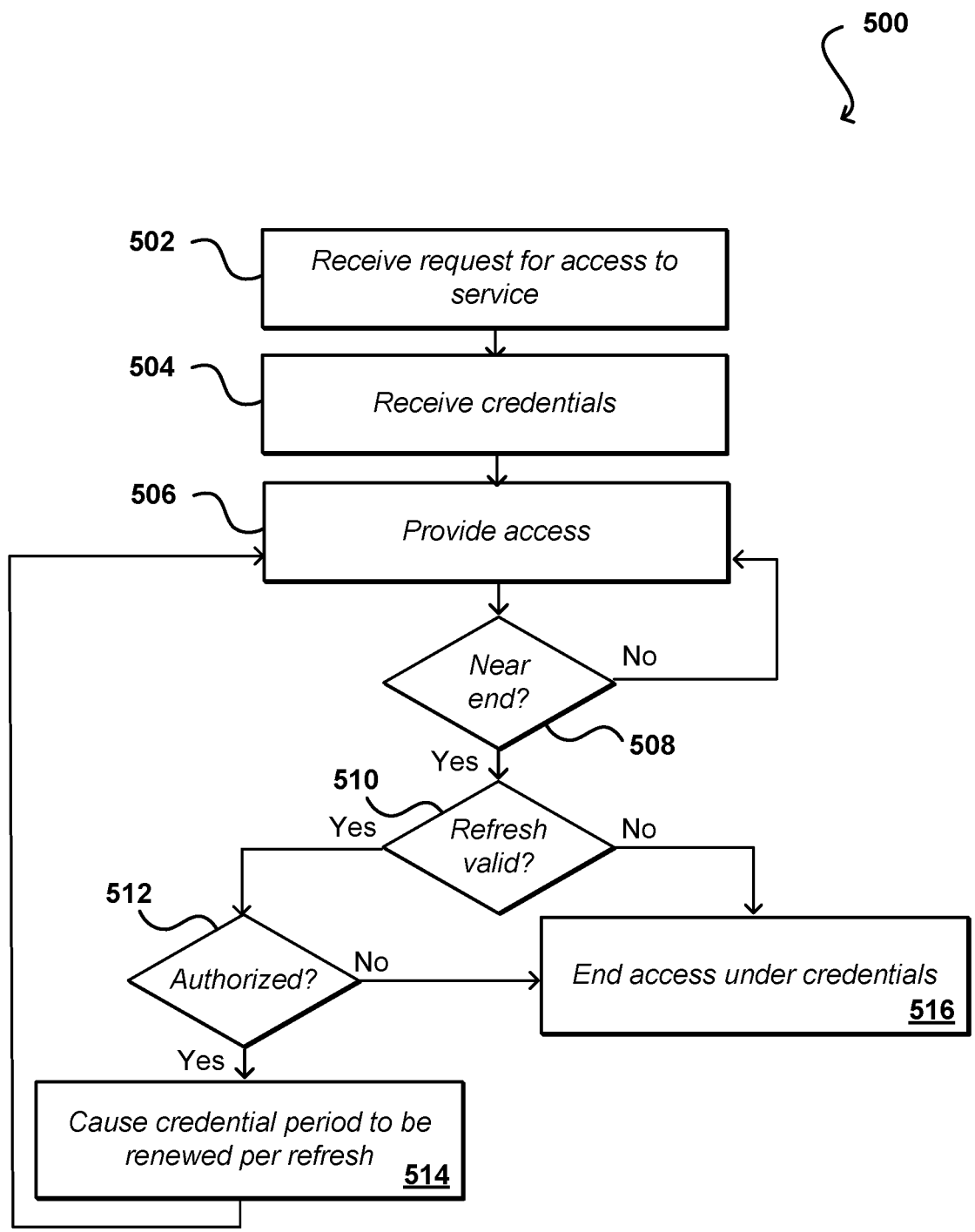
FIG. 5 illustrates an example process for managing access using credentials and a client-held refresh token that can be utilized in accordance with various embodiments

FIG. 5 illustrates an example process 500 for managing sessions in a service provider or resource provider environment that can be utilized in accordance with various embodiments. In this example, a request for access to a service (or resources) is received 502. Along with, or separately from, the request, a set of credentials can be received 504 that can be used to obtain such access. The credentials can be analyzed to determine whether the credentials are sufficient to obtain authorization for the access, using approaches discussed and suggested herein, and if so the access can be provided 506. The lifetime of the credentials can be determined and/or monitored, and as long as the credential is not near the end of its lifetime 508 the access on the session can continue. If the credentials are determined to be near the end of their lifetime, a determination can be made 510 as to whether the requesting client device (or an associated entity or device) has a valid copy of a refresh token for the credentials. This can include, for example, sending a request to the client device and receiving proof of possession of the refresh token, or the refresh token signed under a session key, among other such options. If it can be determined that a valid refresh token does not exist, the access under the credentials can be ended 516 when the current lifetime of the credential expires. If the refresh token is still valid, a re-verification can be performed to determine whether the access under the credentials is still authorized 512 for current conditions. As mentioned, the credentials and refresh token were issued at a previous time, and conditions or configuration may have changed since that time. For example, the credentials may have been rotated or revoked. Another determination can then be performed to determine whether those same credentials would be sufficient to gain access to the resource at the current time under the current configuration, including any changes to authorization or authentication criteria, or credential configuration, among other such options. If not, then the access under the credentials can be ended at the end of the lifetime of those credentials. Otherwise, if the credentials would still be able to obtain access under current configuration, the credential period can be caused 514 to be renewed per the period or other ability of the refresh token.

Figure 6:
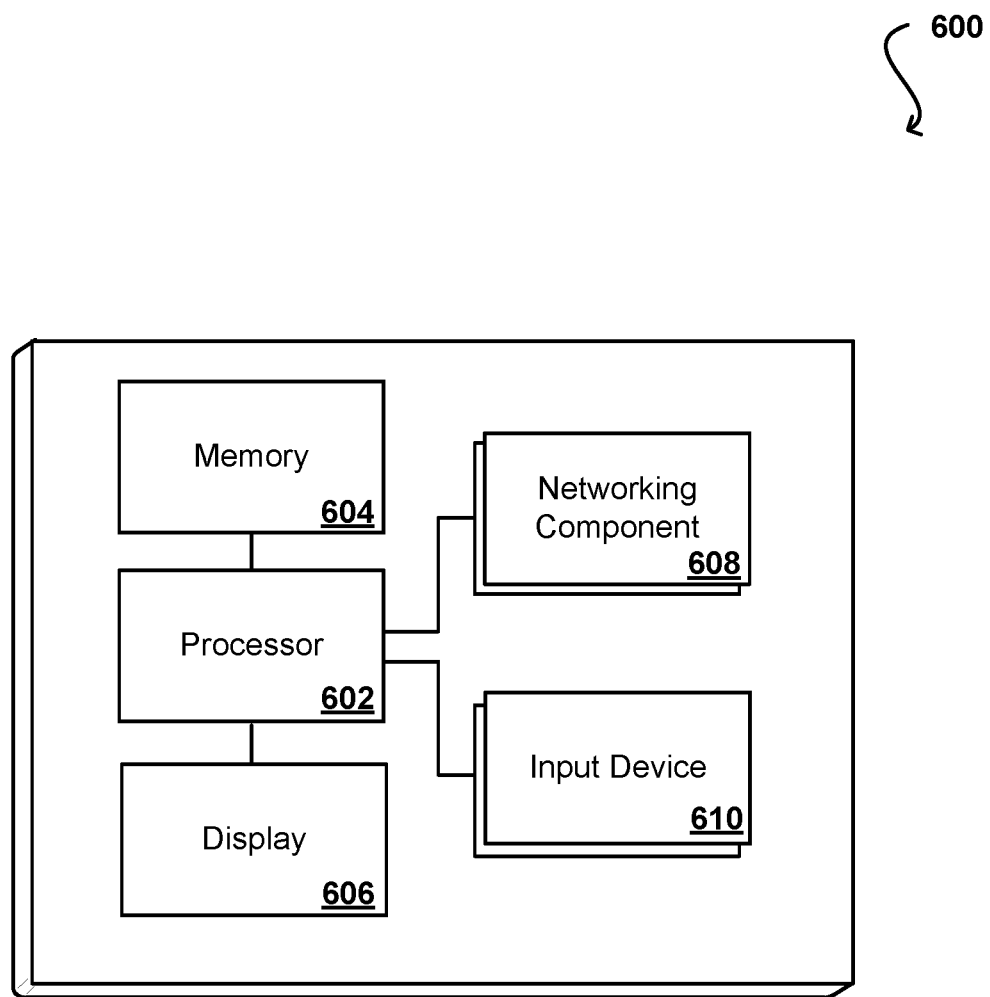
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining that a client is authorized to use one or more electronic resources for a user-configured amount of time that is associated with a credential, the user-configured amount of time based at least in part on a predetermined specific period of time for accessing the one or more electronic resources;
   modifying, during the user-configured amount of time for the credential, a criteria to access the one or more electronic resources using the credential, based at least in part on a reevaluation of configuration information relating to the one or more electronic resources and a change in the configuration information;
   determining, prior to an end of the user-configured amount of time, that the client possesses a valid refresh token associated with the credential;
   performing a second determination, with respect to the modified criteria, that the client is still authorized to access the one or more electronic resources; and
   extending the user-configured amount of time of the credential.

2. The computer-implemented method of claim 1, further comprising:
   determining that the one or more electronic resources is sufficient to perform a task requested by the client; and
   allocating the one or more electronic resources for use by the client for the task within the user-configured amount of time.

3. The computer-implemented method of claim 1, further comprising:
   causing the credential to be renewed in response to a type of change being a first type of change corresponding to a set of permissible changes for the criteria to access the one or more electronic resources.

4. The computer-implemented method of claim 1, further comprising:
   determining that the user-configured amount of time of the credential will end within a time period after the extension of the user-configured amount of time;
   receiving, from the client, proof of possession of the valid refresh token;
   determining that the client is no longer authorized to access the one or more resources according to the modified criteria; and
   causing access to the one or more electronic resources to be revoked at an end of the time period.

5. A system, comprising:
   at least one processor; and
   memory including instructions that, when executed by the at least one processor, cause the system to:
   receive, from a client, an amount of time to be associated with a credential for access an electronic resource, the amount of time based at least in part on a predetermined specific period of time for accessing the electronic resource;
   modify, during the amount of time, a criteria to access the electronic resource, based at least in part on a change in configuration of the electronic resource;
   determine, prior to an end of the amount of time, that the client possesses a valid refresh token associated with the credential; and
   extend the amount of time for the client to access the electronic resource based in part on a current authorization to access the electronic resource under the modified criteria.

6. The system of claim 5, wherein the instructions that, when executed by the at least one processor, further cause the system to:
   perform a first extension of the amount of time for the credential, based at least in part on extending the amount of time by an additional time associated with a lifetime period for the credential.

7. The system of claim 5, wherein the instructions that, when executed by the at least one processor, further cause the system to:
   verify the valid refresh token based in part on the valid refresh token comprising at least one of identification information, account information, and policy information.

8. The system of claim 5, wherein the instructions that, when executed by the at least one processor, further cause the system to:
   perform a second extension of the amount of time for the credential based in part on a new refresh token issued for the current authorization existing to access the electronic resource under the modified criteria.

9. The system of claim 5, wherein the instructions that, when executed by the at least one processor, further cause the system to:
   issue the refresh token with the credential for storage on the client.

10. The system of claim 5, wherein the instructions that, when executed by the at least one processor, further cause the system to:
    issue the refresh token separately from the credential;
    enable the client to provide a second amount of time associated with a validity of the refresh token.

11. The system of claim 5, wherein the instructions that, when executed by the at least one processor, further cause the system to:
    perform a second determination that a difference between the criteria to access the electronic resource at a time of issuance of the credential and the modified criteria is within a set of permissible changes.

12. The system of claim 5, wherein the instructions that, when executed by the at least one processor, further cause the system to:
    enable the electronic resource to assume a role associated with the credential for performing a task.

13. The system of claim 5, wherein the instructions that, when executed by the at least one processor, further cause the system to:
    initiate a session for performing a task in response to the client being authorized to access the electronic resource; and
    continue the session in response to determining that the client is still authorized under the modified criteria.

14. The system of claim 5, wherein the instructions that, when executed by the at least one processor, further cause the system to:
   determine that the amount of time of the credential will end within a time period after the extension of the amount of time for the client to access the electronic resource;
   receive, from the client, proof of possession of the valid refresh token;
   determine that the client is no longer authorized to access the electronic resource according to the modified criteria; and
   cause access to the electronic resource to be revoked at an end of the time period.

15. The system of claim 5, wherein the instructions that, when executed by the at least one processor, further cause the system to:
   determine that the electronic resource is sufficient to perform a task requested by the client; and
   allocate the electronic resource for use by the client for the task within the amount of time.

16. The system of claim 5, wherein the instructions that, when executed by the at least one processor, further cause the system to:
   cause the credential to be renewed in response to a type of change being a first type of change corresponding to a set of permissible changes for the criteria to access the electronic resource.

17. A non-transitory computer readable medium comprising instructions that when executed by at least one processor cause the at least one processor to:
   receive, from a client, an amount of time to be associated with a credential for access an electronic resource, the amount of time based at least in part on a predetermined specific amount of time for accessing the electronic resource;
   modify, during the amount of time, a criteria to access the electronic resource, based at least in part on a change in operating conditions for the electronic resource;
   determine, prior to an end of the amount of time, that the client possesses a valid refresh token associated with the credential; and
   extend the amount of time for the client to access the electronic resource based in part on a current authorization to access the electronic resource under the modified criteria.

18. The non-transitory computer readable medium of claim 17 comprising the instructions that when executed by the at least one processor further cause the at least one processor to:
   determine that the amount of time of the credential will end within a time period after the extension of the amount of time for the client to access the electronic resource;
   receive, from the client, proof of possession of the valid refresh token;
   determine that the client is no longer authorized to access the electronic resource according to the modified criteria; and
   cause access to the electronic resource to be revoked at an end of the time period.

19. The non-transitory computer readable medium of claim 17 comprising the instructions that when executed by the at least one processor further cause the at least one processor to:
   determine that the electronic resource is sufficient to perform a task requested by the client; and
   allocate the electronic resource for use by the client for the task within the amount of time.

20. The non-transitory computer readable medium of claim 17 comprising the instructions that when executed by the at least one processor further cause the at least one processor to:
   cause the credential to be renewed in response to a type of change being a first type of change corresponding to a set of permissible changes for the criteria to access the electronic resource.

* * * * *